(12) United States Patent
Li et al.

(10) Patent No.: US 11,693,494 B2
(45) Date of Patent: Jul. 4, 2023

(54) ELECTROMAGNETIC STYLUS, PROCESSING DEVICE, AND PROCESSING METHOD

(71) Applicant: Shenzhen Huion Animation Technology Co., Ltd., Shenzhen (CN)

(72) Inventors: Meilun Li, Shenzhen (CN); Yuanhua Liao, Shenzhen (CN)

(73) Assignee: SHENZHEN HUION ANIMATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/412,362

(22) Filed: Aug. 26, 2021

(65) Prior Publication Data

US 2022/0066578 A1 Mar. 3, 2022

(30) Foreign Application Priority Data

Aug. 31, 2020 (CN) .......................... 2020108936655
Aug. 31, 2020 (CN) .......................... 2020108940415
Aug. 31, 2020 (CN) .......................... 2020218698682

(51) Int. Cl.
*G06F 3/0354* (2013.01)
*B29C 45/14* (2006.01)
(Continued)

(52) U.S. Cl.
CPC .... *G06F 3/03545* (2013.01); *B29C 45/14065* (2013.01); *B29C 45/14778* (2013.01);
(Continued)

(58) Field of Classification Search
CPC ........... G06F 3/03545; B29C 45/14065; B29C 45/14778; B29C 45/401; B29K 821/00;
(Continued)

(56) References Cited

U.S. PATENT DOCUMENTS

| | | | |
|---|---|---|---|
| 5,461,204 A * | 10/1995 | Makinwa | G06F 3/046 178/19.03 |
| 2003/0141119 A1 * | 7/2003 | Chao | B43K 8/22 178/19.01 |

(Continued)

*Primary Examiner* — Peter D McLoone
(74) *Attorney, Agent, or Firm* — IPro, PLLC

(57) ABSTRACT

The utility model provides an electromagnetic stylus having a tip, a first magnetic core, a second magnetic core and a cartridge. The tip includes a nib arranged at an end portion thereof. The first magnetic core has a first through hole. The second magnetic core is arranged on a distal end of the first magnetic core from the nib, having a second through hole. An inner diameter of the second through hole is less than an inner diameter of the first through hole, the tip sequentially penetrates through the first through hole and the second through hole. A step structure is arranged on a proximal end of the second magnetic core to the nib. A spacer is arranged on an inner wall of the cartridge, the first magnetic core and the second magnetic core are at least partially received in the cartridge and respectively positioned on two sides of the spacer, the step structure abuts against the spacer, a thickness of the step structure is less than a thickness of the spacer along a lengthwise direction of the tip.

15 Claims, 15 Drawing Sheets

(51) Int. Cl.
*B29C 45/40* (2006.01)
*B29L 31/34* (2006.01)
(52) U.S. Cl.
CPC ........ *B29C 45/401* (2013.01); *B29K 2821/00* (2013.01); *B29K 2995/0008* (2013.01); *B29K 2995/0046* (2013.01); *B29L 2031/34* (2013.01)
(58) Field of Classification Search
CPC .... B29K 2995/0008; B29K 2995/0046; B29L 2031/34
See application file for complete search history.

(56) References Cited

U.S. PATENT DOCUMENTS

| | | | | |
|---|---|---|---|---|
| 2014/0043300 | A1* | 2/2014 | Lien ................... | G06F 3/03545 345/179 |
| 2015/0084935 | A1* | 3/2015 | Lien ................... | G06F 3/03545 345/179 |

* cited by examiner

ELECTROMAGNETIC STYLUS, PROCESSING DEVICE, AND PROCESSING METHOD

FIELD OF THE PRESENT DISCLOSURE

The present disclosure relates to the technical field of computer peripheral devices, and in particular, relates to an electromagnetic stylus, a processing device, and a processing method.

DESCRIPTION OF RELATED ART with advancement of technologies, digital electronic information devices have a trajectory input function. This function is generally implemented in a handwriting fashion. Electromagnetic styluses are widely used as the trajectory input devices of the digital electronic information devices. The electromagnetic stylus is not only capable of implementing text input by handwriting, but also capable of implementing drawing, point control, and the like functions.

In the conventional process and actual manufacture of the electromagnetic stylus in the related art, the electromagnetic stylus generally employs a dual-magnetic core structure, and frequency variations are effectively adjusted by adjusting a spacing between a first magnetic core and a second magnetic core. A fixed and accurate distance needs to be maintained between the first magnetic core and the second magnetic core before a tip of the electromagnetic stylus in in a writing state. For this objective, in the related art, a thin film sheet is typically sandwiched between the first magnetic core and the second magnetic core to ensure that the distance between the two magnetic cores reach a predetermined value. However, since the thin film sheet is generally an elastic element made of a thin elastic material, due to difficulties in manufacture precision control, the thin film sheet is apt to be subject to deformation or flash in the process and is thus uncontrollable. As such, manufacture quality of the electromagnetic stylus is difficult to control, and thus consistency and reliability are poor.

Therefore, it is desired to provide a processing device for electromagnetic styluses and a processing method thereof to address the above problem.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
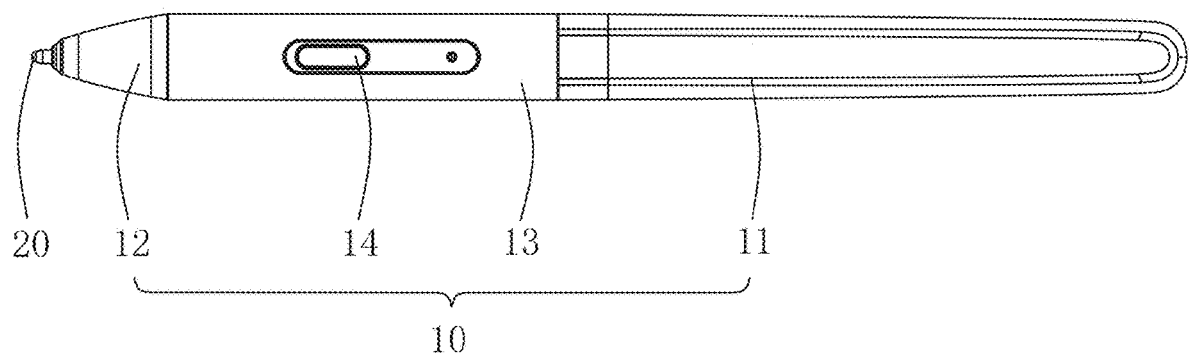
FIG. 1 is a schematic perspective assembling view of an electromagnetic stylus according to the present disclosure.
Figure 2:
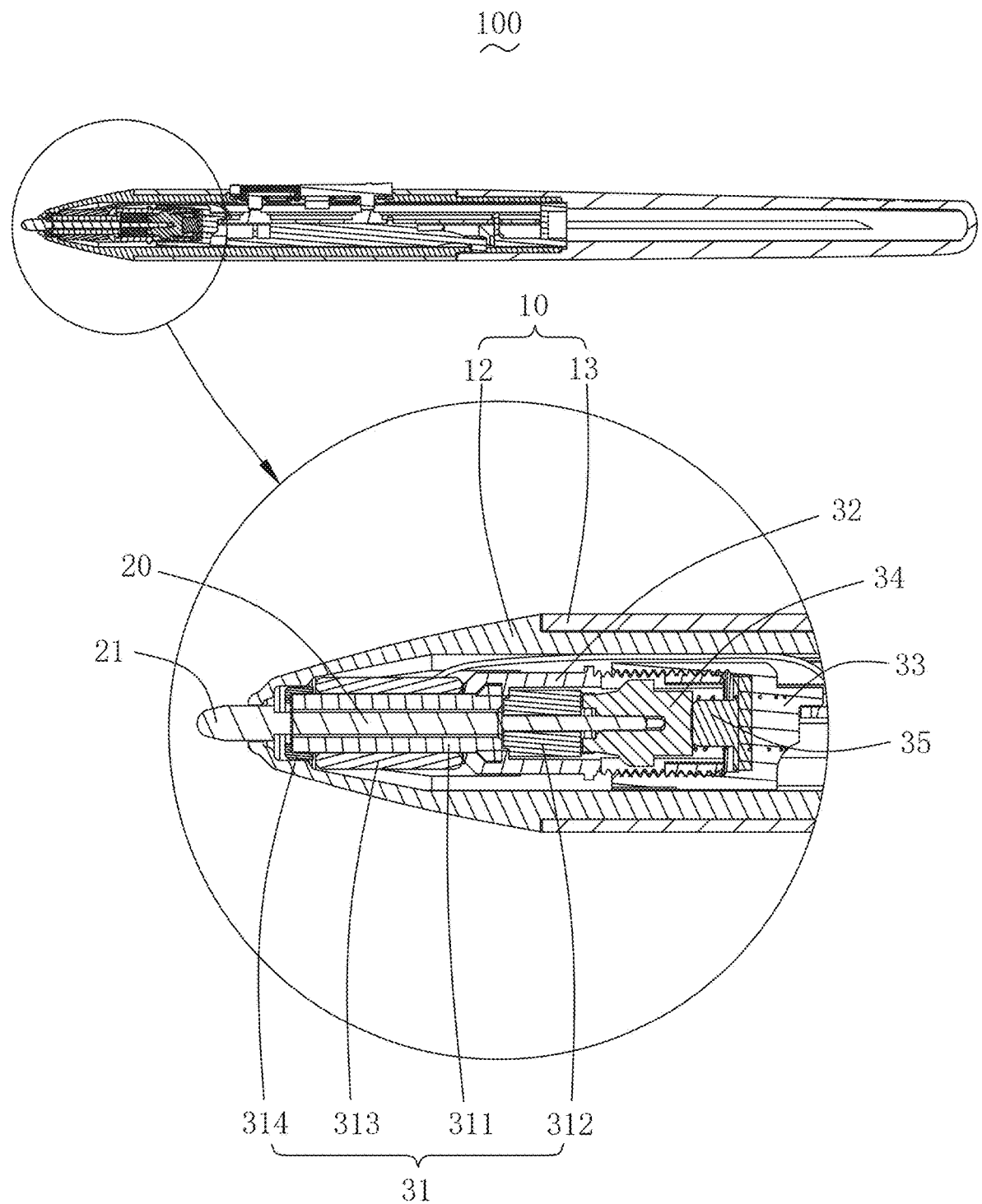
FIG. 2 is a schematic sectional view of the electromagnetic stylus in FIG. 1.
Figure 3:
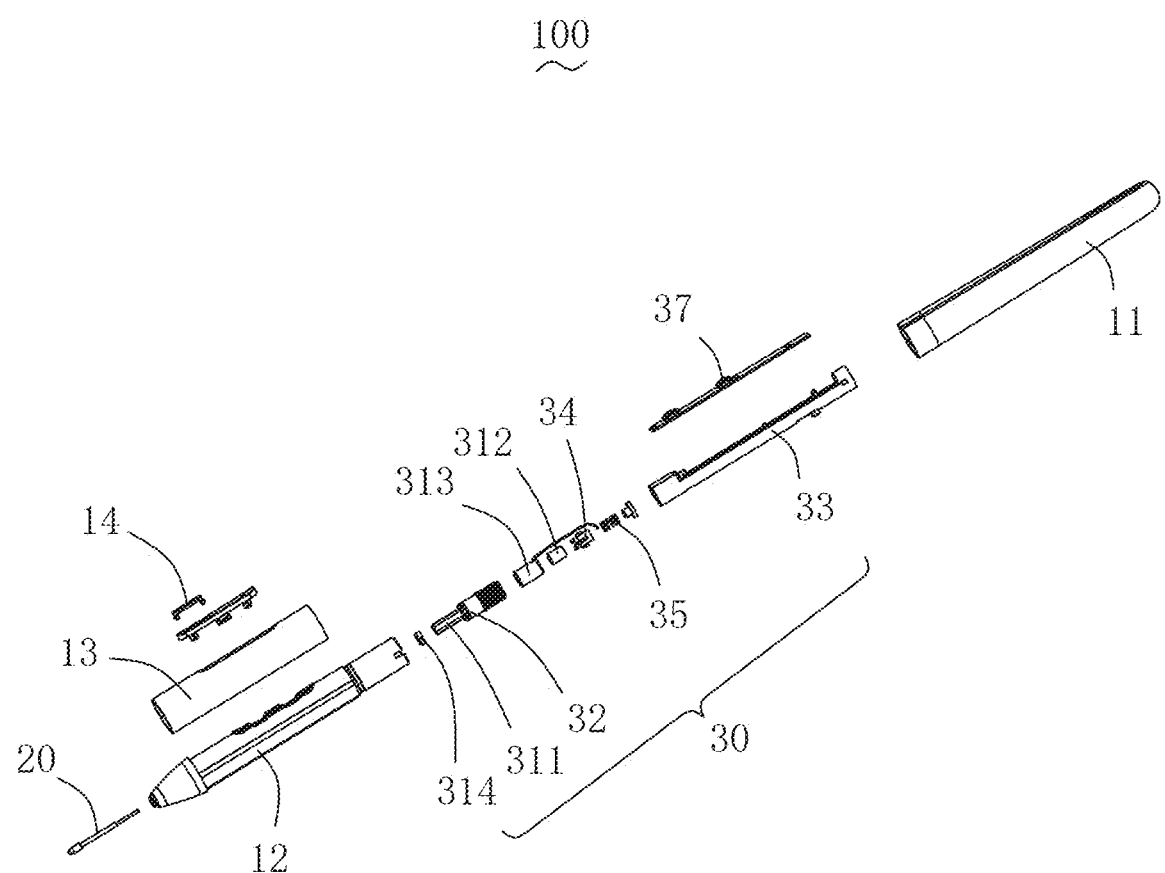
FIG. 3 is a schematic perspective exploded view of the electromagnetic stylus in FIG. 1.

Referring to FIG. 1 to FIG. 3, FIG. 1 is a schematic perspective assembling view of an electromagnetic stylus according to the present disclosure, FIG. 2 is a schematic sectional view of the electromagnetic stylus in FIG. 1, and FIG. 3 is a schematic perspective exploded view of the electromagnetic stylus in FIG. 1. The electromagnetic stylus 100 includes a housing 10, a tip 20, and an electromagnetic inductor 30 arranged in the housing 10.

The housing 10 includes an upper housing 11 and a lower housing 12 that are in cooperation with each other, a silica gel jacket 13 sleeved on the lower housing 12, and a key 14 arranged on a surface of the lower housing 12. The tip 20 includes a nib 21 configured to write.

The electromagnetic inductor 30 is configured to fix the tip 20 and sense a writing trajectory of the tip 20. The electromagnetic inductor 30 includes a magnetic assembly 31, a cartridge 32, a bracket 32, an ejector rod 34, an elastic assembly 35, and a resonator circuit board 37. The tip 20 runs through the cartridge 32.

The magnetic core assembly 31 includes a first magnetic core 311 proximal to the nib 21, a second magnetic core 312, a coil 313 wound on the first magnetic core 311, and a silica gel sheath 314 sleeved on an end, proximal to the nib 21, of the first magnetic core 311. The first magnetic core 311 and the second magnetic core 312 are hollow magnetic cores, and the first magnetic core 311 is provided with a first through hole 3111 (Referring to FIG. 4) configured to allow the tip 20 to run through. The second magnetic core 312 is arranged on an end, distal from the nib 21, of the first magnetic core 311, and the second magnetic core 312 is provided with a second through hole 3121 (Referring to FIG. 7) configured to allow the tip 20 to run through. One end of the first magnetic core 311 and the second magnetic core 312 are received in the cartridge 32. The tip 20 sequentially runs through the silica gel sheath 314, the first magnetic core 311, and the second magnetic core 312. The silica gel sheath 314 is configured to protect the first magnetic core 311 and to achieve an anti-shock effect. Particularly, an inner diameter of the first through hole 3111 is greater than an inner diameter of the second through hole 3121, and the tip 20 is correspondingly made to a step structure, such that during writing, the tip 20 drives the second magnetic core 312 to move axially.

Figure 4:
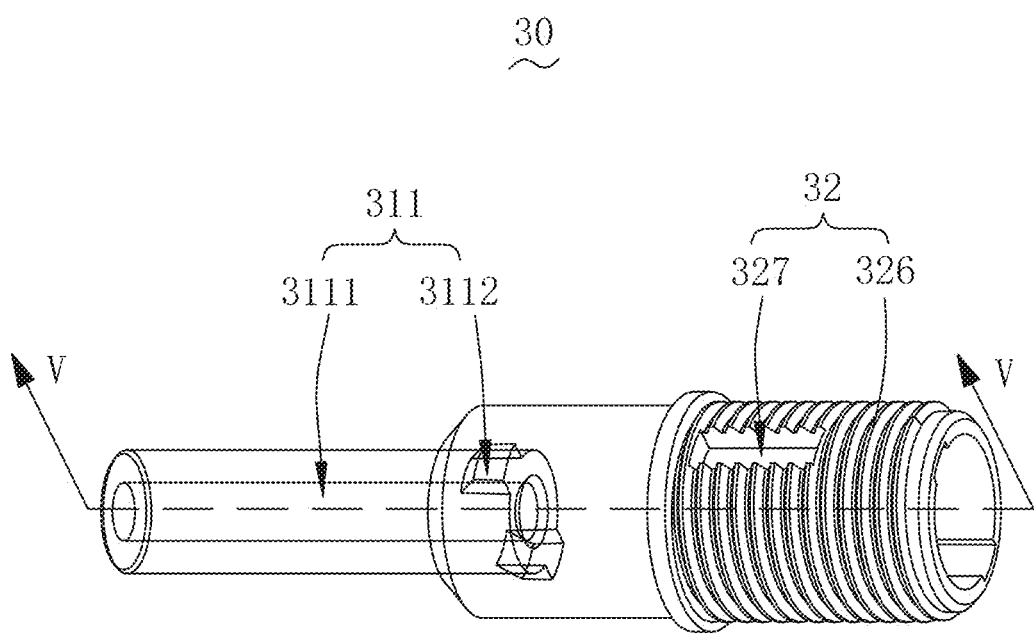
FIG. 4 is a schematic perspective view of a first magnetic core and a cartridge in FIG. 2.
Figure 5:
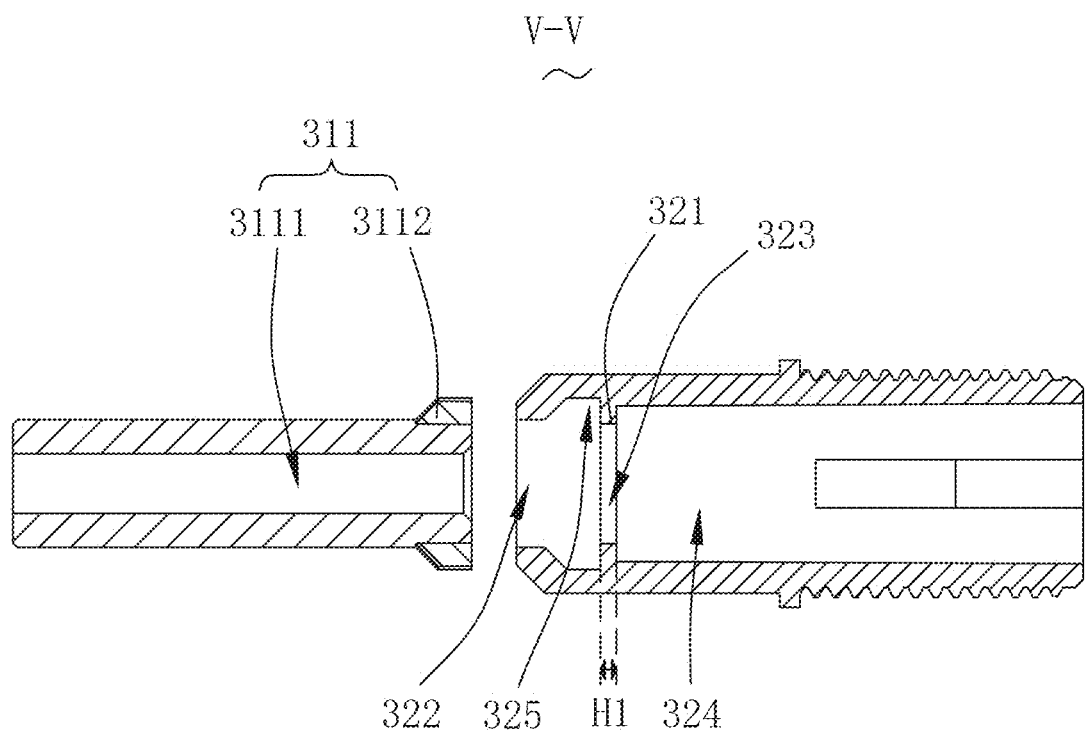
FIG. 5 is a schematic sectional view of the first magnetic core and the cartridge in FIG. 4.

Referring to FIG. 1 to FIG. 5, FIG. 4 is a schematic perspective view of a first magnetic core and a cartridge in FIG. 2, and FIG. 5 is a schematic sectional view of the first magnetic core and the cartridge in FIG. 4. Referring to FIG. 5. A spacer 321 is arranged in an inner wall of the cartridge 32. The first magnetic core 311 and the second magnetic core 312 are at least partially received in the cartridge 32 and respectively arranged on two sides of the spacer 321. Specifically, the cartridge 32 includes a first space 322 configured to receive one end of the first magnetic core 311, a second space 323 enclosed by the spacer 321, and a third space 324 configured to receive the second magnetic core 312. Particularly, in this embodiment, the spacer 321 is a protrusion structure.

Particularly, two grooves 325 are arranged on a side, proximal to the nib 21, of the cartridge 32, and two protrusions 3112 are arranged on two sides of an end, distal from the nib 21, of the first magnetic core 311. The protrusions 3112 are engaged with and fixed to the grooves 325, such that during writing, the first magnetic core 311 is fixed. In this case, the first magnetic core 311 may be placed prior to injection molding of the cartridge 32. In another embodiment, a third straight slot (not illustrated) is arranged on a side, proximal to the nib 21, of the cartridge 32, and the protrusion 3112 of the first magnetic core 311 enters the cartridge 32 via the third straight slot and is fixed to the grooves 325.

Referring to FIG. 3 to FIG. 4, A threaded structure 326 is arranged on an outer surface of an end, distal from the nib 21, of the cartridge 32. The threaded structure 326 is configured to be thread-engaged with and fixed to the bracket 33.

Figure 6:
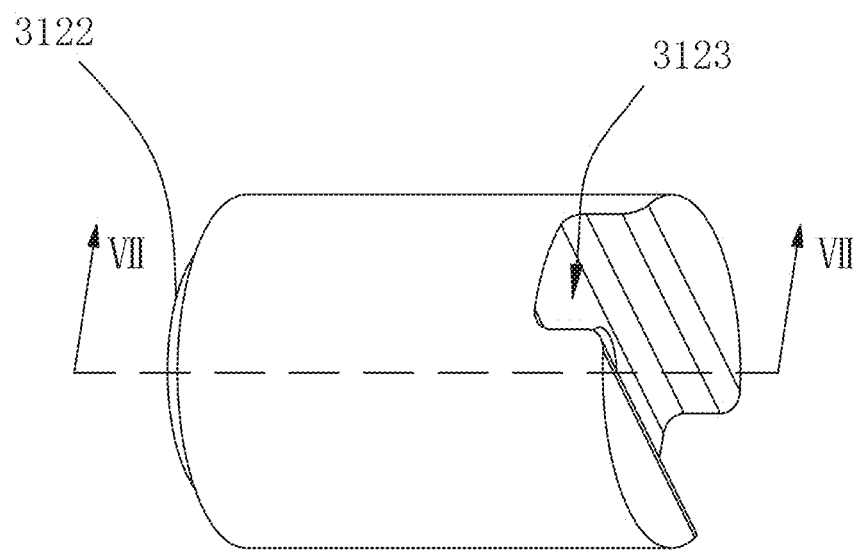
FIG. 6 is a schematic perspective view of a second magnetic core in FIG. 2.
Figure 7:
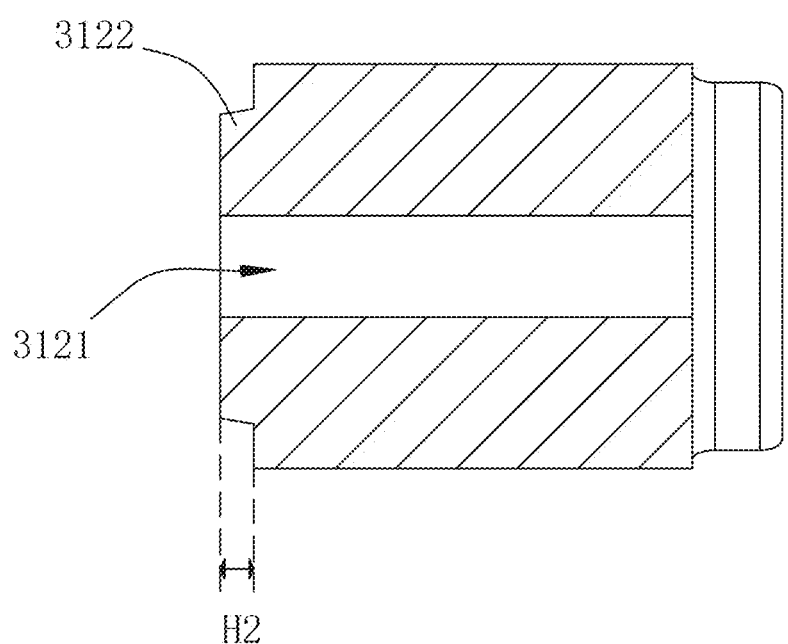
FIG. 7 is a schematic sectional view of the second magnetic core in FIG. 6.
Figure 8:
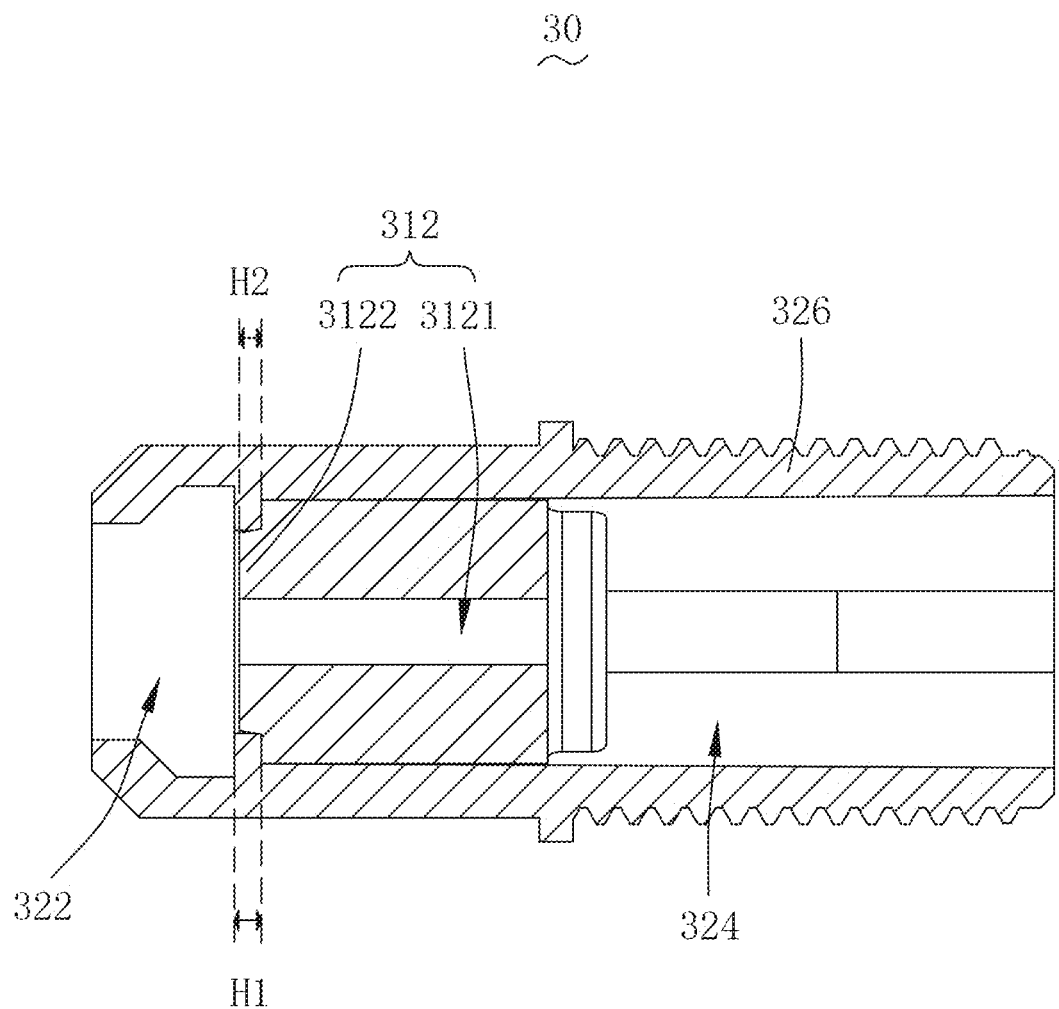
FIG. 8 is a schematic sectional view of assembling between the cartridge and the second magnetic core in FIG. 2.

Referring to FIG. 6 to FIG. 8, FIG. 6 is a schematic perspective view of a second magnetic core, FIG. 7 is a schematic sectional view of the second magnetic core in FIG. 6, and FIG. 8 is a schematic sectional view of assembling between the cartridge in FIG. 2 and the second magnetic core. A step structure 3122 is arranged on an end, proximal to the nib 21, of the second magnetic core 312. The step structure is abutted against the spacer 321 such that a spacing between the first magnetic core 311 and the second magnetic core 312 from is not over-great. In addition, a thickness H2 of the step structure 3122 along an axial direction is less than a thickness H1 of the spacer 321 along an axial direction such that the first magnetic core 311 is not directly abutted against the second magnetic core 312. In this way, the electromagnetic stylus 100, before use in writing, maintains a fixed and accurate distance, H=H1−H2. The second magnetic core 312 further includes a first straight slot 3123 arranged on an end distal from the nib 21. The first straight slot 3123 is configured to be engaged with the ejector rod 34 to achieve an anti-rotation effect.

Figure 9:
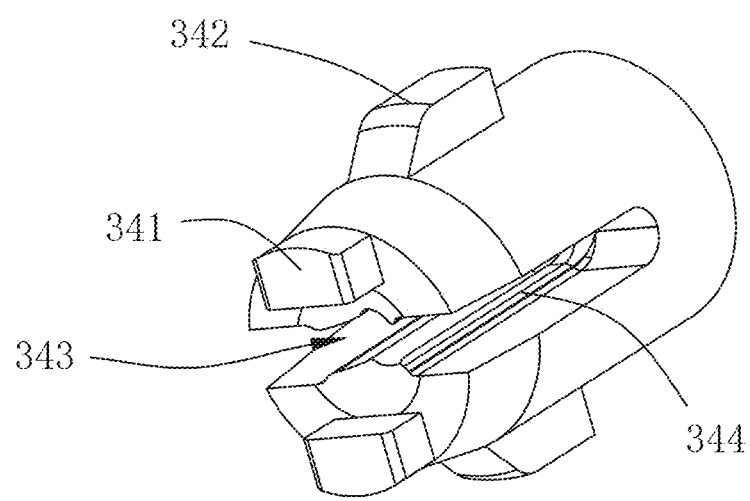
FIG. 9 is a schematic perspective view of an ejector rod in FIG. 2.
Figure 10:
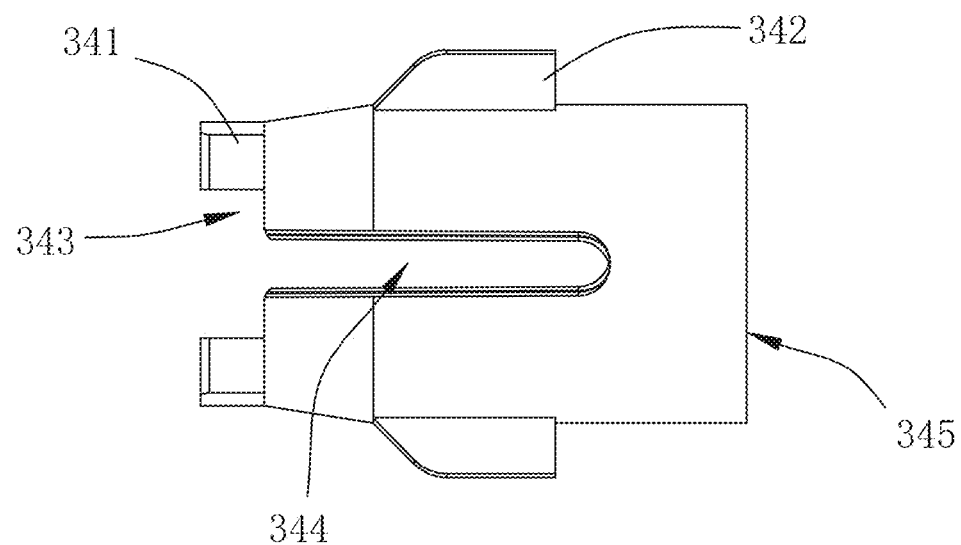
FIG. 10 is a schematic sectional view of the ejector rod in FIG. 9.

Referring to FIG. 9 and FIG. 10, FIG. 9 is a schematic perspective view of an ejector rod in FIG. 2, and FIG. 10 is a schematic sectional view of the ejector rod in FIG. 9. A snap portion 341 fitted to the first straight slot 3123, a pillar protrusion 342, a second straight slot 343, a blind hole 344, and a smooth end surface 345 are arranged on the ejector rod 34. The snap portion 341 is configured to be fitted to the first straight slot 3123 of the second magnetic core 312 to prevent the second magnetic core 312 from being rotated. The pillar protrusion 342 is arranged on each of two sides of the ejector rod 34, and two side holes 327 are arranged on an end, distal from the nib 21, of the cartridge 32. The side holes 327 are respectively fitted to the pillar protrusions 342. The pillar protrusion 342 may be engaged into the side holes 327 to prevent the ejector rod 34 from being rotated, and meanwhile retain the ejector rod 34 and restrict a maximum stroke of the ejector rod 34. The second straight slot 343 and the blind hole 344 are arranged on an end, proximal to the nib 21, of the ejector rod 34. The smooth end surface 345 is arranged on an end, distal from the nib 21, of the ejector rod 34. The tip 20 is inserted into the blind hole 344. The second straight slot 343 is configured to supply a deformation space for the tip 20. The smooth end surface 345 is abutted against the elastic assembly 35.

Referring to FIG. 3, The resonator circuit board 37 is fixed on the bracket 33. The bracket 33 is fitted to the upper housing 11.

Before writing with the electromagnetic stylus, the first magnetic core 311 is fitted into the groove 325 of the cartridge 32, the first magnetic core 311 is fixed into the cartridge 32, the second magnetic core 312 is abutted against a side of the spacer 321, and a constant distance H is maintained between the first magnetic core 311 and the second magnetic core 312, wherein H=H1−H2. During writing, the tip 20 drives the second magnetic core 312 to move axially such that an inductance value is changed.

Relative to the related art, in the electromagnetic stylus according to the present disclosure, the spacer 321 is arranged in the cartridge 32, the step structure 3122 is arranged on an end, proximal to the nib 21, of the second magnetic core 312, and the thickness of the step structure 3122 in the axial direction is less than the thickness of the spacer 321 in the axial direction, such that the first magnetic core 311 and the second magnetic core 312 are respectively arranged on two sides of the spacer 321, and in addition, the first magnetic core 311 and the second magnetic core 312 maintain an accurate distance therebetween before writing and no thin film sheet is used, thereby saving the manufacture cost. Further, the groove 325 is arranged in the cartridge 32 to be fitted to the first magnetic core 311, to prevent the first magnetic core 311 from being rotated. The side hole 327 is arranged in the cartridge 32 to be fitted to the pillar protrusions 342 of the ejector rod 34, and the snap portion 341 of the ejector rod is fitted to the second magnetic core 312, to prevent the second magnetic core 312 from being rotated. In this way, the electromagnetic frequency is stably changed during use of the electromagnetic stylus, such information as force and trajectory during use of the electromagnetic stylus by a user is sensitively captured, and a good writing effect is achieved.

The present disclosure further provides a method for manufacturing an electromagnetic stylus 100. The method includes providing a mold and a first magnetic core; and forming the cartridge by injection molding; wherein the cartridge and the first magnetic core are integrally connected.

Figure 11:
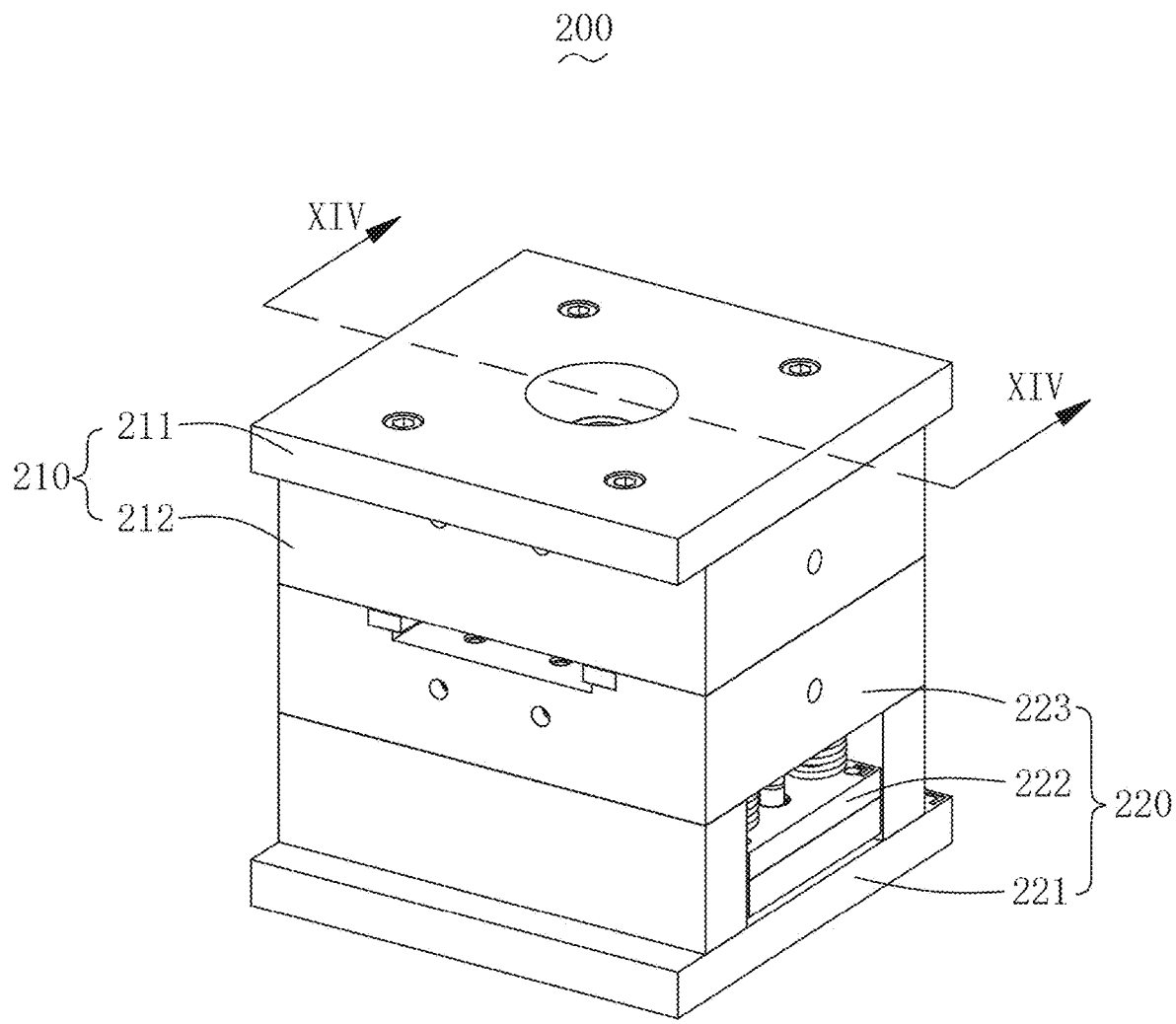
FIG. 11 is a schematic perspective view of a mold in a closing state according to the present disclosure.
Figure 12:
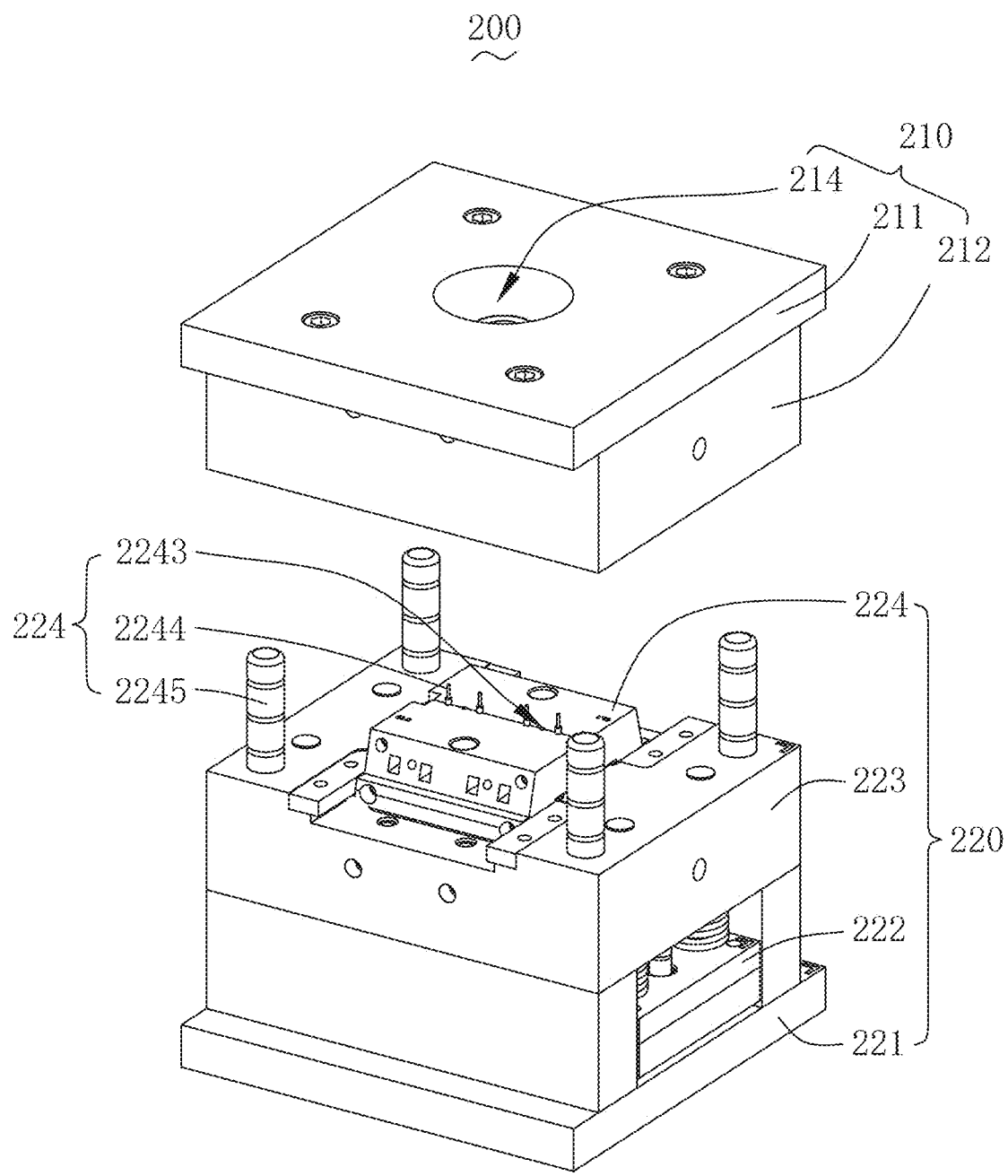
FIG. 12 is a schematic perspective view of a mold in an opening state according to the present disclosure.

Referring to FIG. 11 to FIG. 15, FIG. 11 is a schematic perspective view of a mold for manufacturing the cartridge of the electromagnetic stylus in a closing state according to the present disclosure, and FIG. 12 is a schematic perspective view of a mold for manufacturing the cartridge of the electromagnetic stylus in an opening state according to the present disclosure. The present disclosure provides a mold 200 configured to form a cartridge 230 by injection molding. The first magnetic core 240 is fixed into the cartridge 230.

The mold 200 includes an upper mold assembly 210 and a lower mold assembly 220 engaged with the upper mold assembly 210.

Figure 13:
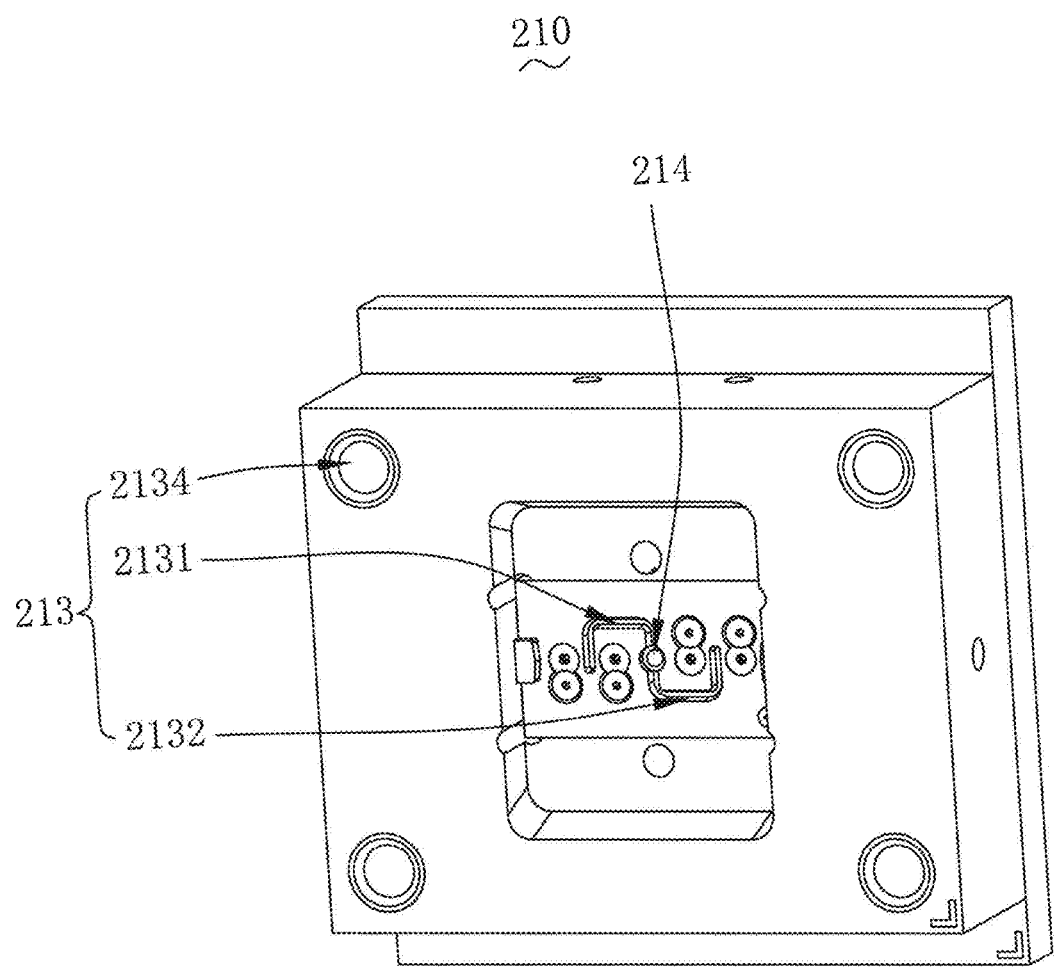
FIG. 13 is a schematic perspective view of an upper mold assembly in FIG. 12 in another angle.
Figure 14:
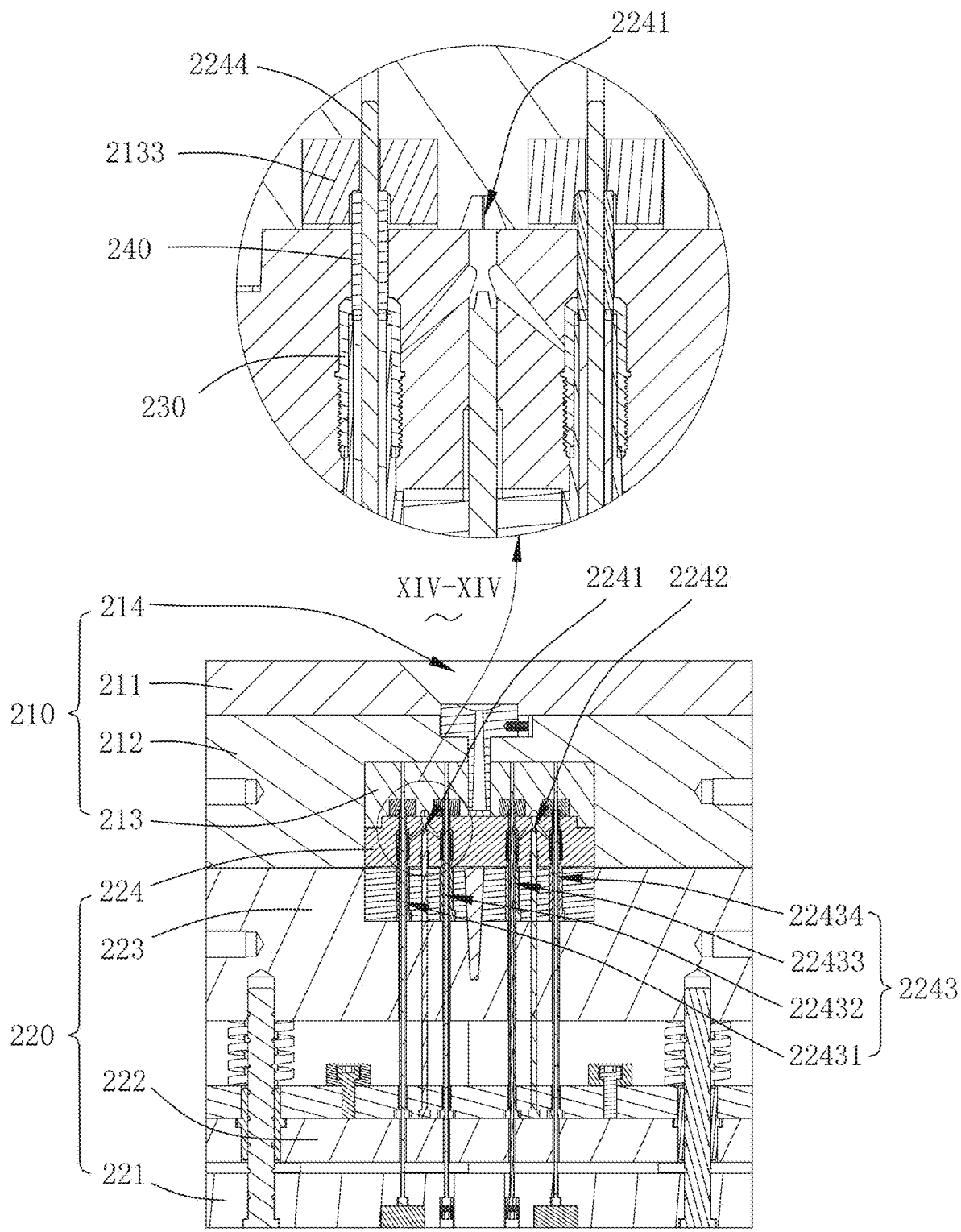
FIG. 14 is a schematic sectional view of the mold in FIG. 11.

Referring to FIG. 13 and FIG. 14, FIG. 13 is a schematic perspective view of an upper mold assembly of a mold for manufacturing an electromagnetic stylus in FIG. 12 in another angle, and FIG. 14 is a schematic sectional view of the mold for manufacturing the electromagnetic stylus 100 in FIG. 11. The upper mold assembly 210 includes an upper mold seat 211 and an upper mold backing plate 212, an upper mold 213 nested on a side, proximal to the lower mold assembly 220, of the upper mold backing plate 212, and an adhesive injection port 214 running through the upper mold seat 211, the upper mold backing plate 212, and the upper mold 213, which are all sequentially stacked from top to bottom. A plurality of guide grooves in communication with the adhesive injection port 214 are arranged on a side, distal from the upper mold backing plate 212, of the upper mold 213. Specifically, in this embodiment, the number of guide grooves is two, and the guide grooves include a first guide groove 2131 and a second guide groove 2132 that are in communication with the adhesive injection port 214.

Figure 15:
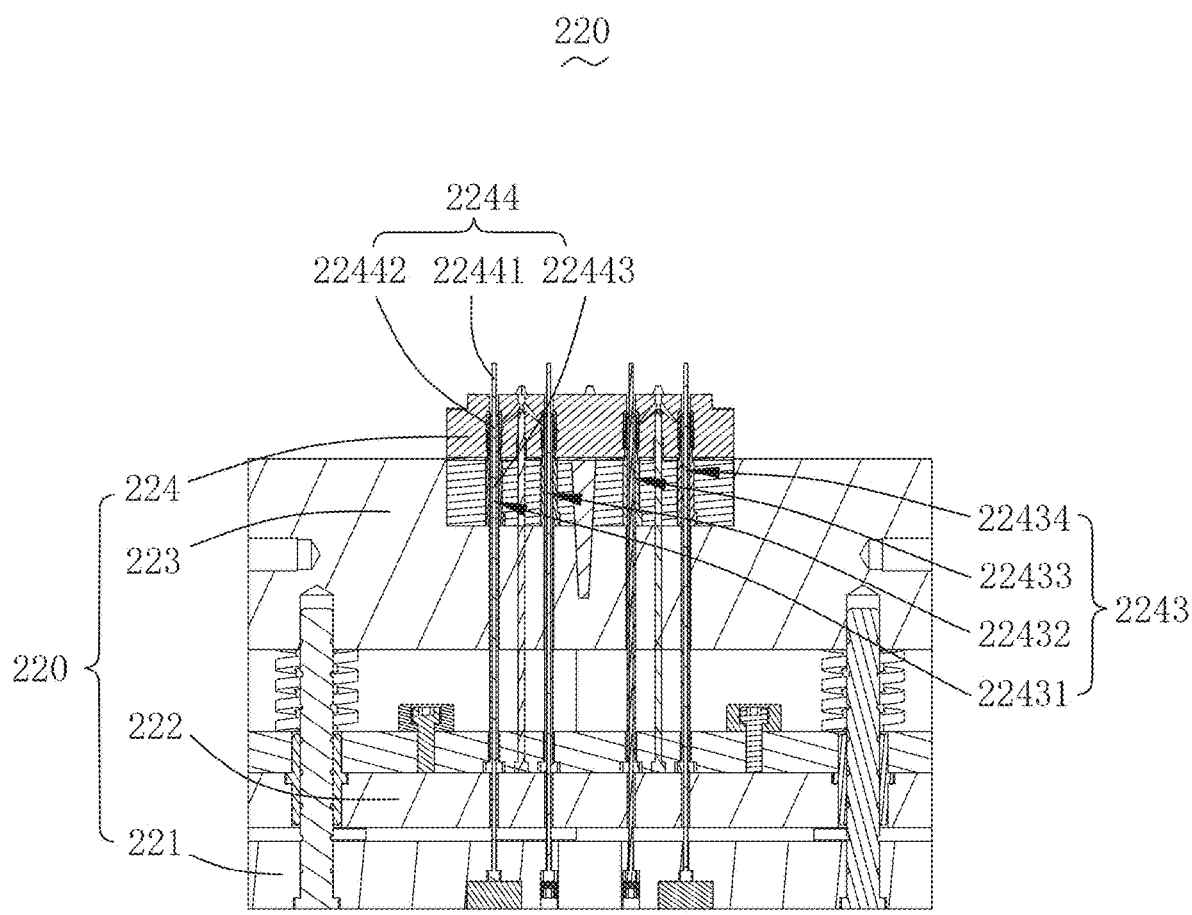
FIG. 15 is a schematic sectional view of a lower mold assembly in FIG. 11.

Referring to FIG. 14 to FIG. 15, FIG. 15 is a schematic sectional view of a lower mold assembly of the mold for manufacturing an electromagnetic stylus 100 in FIG. 11. The lower mold assembly 220 includes a lower mold seat 221, a lower mold backing plate 222, and a lower mold fixing plate 223 that are stacked, and a lower mold 224 nested on the lower mold fixing plate 223. A plurality of divergent runners corresponding to the guide grooves are arranged on a side, proximal to the upper mold 213, of the lower mold 224. Specifically, the divergent runners include a first divergent runner 2241 corresponding to the first guide groove 2131 and a second divergent runner 2242 corresponding to the second guide groove 2132. The lower mold 224 further includes an ejector sleeve 2243 configured to mold the cartridge 230 and an ejector sleeve pin 2244 nested in the ejector sleeve 2243 and configured to fix the first magnetic core 240. The first divergent runner 2241 and the second divergent runner 2242 convey an adhesive to the ejector sleeve 2243. The first magnetic core 240 is sleeved on an upper portion 22441 of the ejector sleeve pin 2244 and an upper end of the first magnetic core 240 is tightly attached to an inner wall of the ejector sleeve 2243. A lower end of the first magnetic core 240 and a middle portion 22442 of the ejector sleeve pin 2244 are spaced apart from the inner wall of the ejector sleeve 2243 to define a cavity. One end of the divergent runner is in communication with the guide groove, and the other end of the divergent runner is in communication with the cavity. Particularly, a lower portion 22443 of the ejector sleeve pin 2244 sequentially runs through the lower mold seat 221, the lower mold backing plate 222, and the lower mold fixing plate 223, and is abutted against one end of the ejector sleeve 2243. An outer diameter of the ejector sleeve pin 2244 progressively increases from the lower portion 22443 through the middle portion 22442 to the upper portion 22441.

Specifically, in this embodiment, the lower mold 224 includes four ejector sleeves 2243, a first ejector sleeve 22431, a second ejector sleeve 22432, a third ejector sleeve 22433, and a fourth ejector sleeve 22434 respectively. The four ejector sleeves 2243 are linearly arranged. The first divergent runner 2241 and the second divergent runner 2242 convey the adhesive to the middle portion of the ejector sleeve 2243. Specifically, the first divergent runner 2241 diverges a plastic melt in the middle portions of the first ejector sleeve 22431 and the second ejector sleeve 22432 for injection molding, and the second divergent runner 2242 diverges the plastic melt in the middle portions of the third ejector sleeve 22433 and the fourth ejector sleeve 22434 for injection molding. By the first divergent runner 2241 and the second divergent runner 2242, the plastic melt is capable of entering the four ejector sleeves 2243 to mold four cartridges 230 in one mold closing process, such that a high injection molding efficiency is achieved.

In other embodiments, the number of ejector sleeves 2243 of the mold 200 according to the present disclosure may be a value other than four, and correspondingly a corresponding number of guide grooves and divergent runners are arranged, which is not limited in the present disclosure.

Particularly, referring to FIG. 14, the upper mold assembly 210 further includes an elastic soft rubber 2133 arranged on a side, proximal to the lower mold assembly 220, of the upper mold 213, wherein the elastic soft rubber 2133 is provided with a central through hole. Before closing of the mold, the first magnetic core 240 is placed on a side, proximal to the upper mold 213, of the ejector sleeve 2243, and the ejector sleeve pin 2244 runs through the first magnetic core 240. During closing of the mold, the first magnetic core 240 is abutted against the central through hole of the elastic soft rubber 2133, and the ejector sleeve pin 2244 runs through the central through hole. The ejector sleeve pin 2244 is configured to fix the first magnetic core 240 and run through the central through hole of the elastic soft rubber 2133. The first magnetic core 240 is sleeved on the ejector sleeve pin 2244. The elastic soft rubber 2133 is configured to prevent the magnetic core from being crushed during closing of the mold, and meanwhile prevent size problems due to errors.

In addition, referring to FIG. 12, the lower mold assembly 220 further includes guide posts 2245 arranged at four corners of the lower mold 224, referring to FIG. 13, the upper mold assembly 213 includes guide sleeves 2134 corresponding to the guide posts 2245. The guide posts 2245 move upward and downward along the guide sleeves 2134 to complete closing and opening of the upper mold 213 and the lower mold 224. In this way, positioning and guiding of the mold 200 are achieved.

The operating principles of the mold 200 are as follows: before closing of the mold, the first magnetic core 240 is sleeved on the ejector sleeve 2244 and the lower end of the first magnetic core 240 is abutted against the middle portion of the ejector sleeve pin 2244, and then the mold is closed; a plastic melt is injected from the adhesive injection port 214, and the plastic melt flows through the first guide groove 2131 and the second guide groove 2132 to the first divergent runner 2241 and the second divergent runner 2242 and finally flows into the ejector sleeve 2243 until the cavity defined between the ejector sleeve pin 2244 and the ejector sleeve 2243 is fully filled with the plastic melt, and the cartridge 230 is molded integrally with the first magnetic core 240; and upon opening of the mold, the integrally molded the first magnetic core 240 and cartridge is taken out.

Relative to the related art, in the present disclosure, the first guide groove 2131 and the second guide groove 2132 that are in communication with the adhesive injection port 214 are arranged, and the first divergent runner 2241 and the second divergent runner 2242 convey the plastic melt into the ejector sleeve 2243, such that a plurality of cartridges 230 are molded by one mold closing process. In addition, before closing of the mold, the first magnetic core 240 is fixed to the middle portion of the ejector sleeve pin 2244 by the ejector sleeve pin 2244 and the elastic soft rubber 2133, and the first magnetic core 240 is spaced apart from the inner wall of the ejector sleeve 2243 to define a cavity; and upon opening of the mold, the first magnetic core 240 and the cartridge 230 that are integrally molded are obtained, such that the first magnetic core 240 and the cartridge 230 are tightly assembled, manufacture quality of the electromagnetic stylus is improved, and writing performance of the electromagnetic stylus is improved.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An electromagnetic stylus, comprising:
   a tip comprising a nib arranged at an end portion thereof;
   a first magnetic core having a first through hole;
   a second magnetic core having a second through hole, arranged on an end of the first magnetic core distal from the nib, an inner diameter of the second through hole being less than an inner diameter of the first through hole, the tip sequentially running through the first through hole and the second through hole, a step structure being arranged on an end of the second magnetic core proximal to the nib; and
   a cartridge, a spacer being arranged on an inner wall of the cartridge, the first magnetic core and the second magnetic core at least partially received in the cartridge and being respectively positioned on two sides of the spacer, the spacer being abutted against the step structure, a height of the step structure being less than a thickness of the spacer along a lengthwise direction of the tip;
   wherein two grooves are arranged on a side, proximal to the nib, of the cartridge, and two protrusions are arranged on two sides of an end, distal from the nib, of the first magnetic core, the protrusions and the grooves being engaged with and fixed to each other.

2. The electromagnetic stylus according to claim 1, wherein one end of the first magnetic core is received in the cartridge, the second magnetic core is totally received in the cartridge, and the cartridge comprises a first space configured to receive one end of the first magnetic core, a second space enclosed by the spacer, and a third space configured to receive the second magnetic core.

3. The electromagnetic stylus according to claim 1, wherein a first straight slot is arranged on a side, distal from the nib, of the second magnetic core, and the electromagnetic stylus further comprises an ejector rod for insertion of the tip, the first straight slot being engaged with and fixed to the ejector rod, the tip being sequentially inserted into the first magnetic core, the second magnetic core, and the ejector rod.

4. The electromagnetic stylus according to claim 3, wherein a snap portion is arranged on a side, proximal to the second magnetic core, of the ejector rod, the snap portion being fitted to the first straight slot.

5. The electromagnetic stylus according to claim 3, wherein two side holes are arranged at an end, distal from the nib, of the cartridge, and a pillar protrusion is arranged on each of two sides of the ejector rod, the side holes being respectively fitted to the pillar protrusions.

6. The electromagnetic stylus according to claim 3, wherein a second straight slot and a bind hole are arranged on a side, proximal to the nib, of the ejector rod, and an end, distal from the nib, of the ejector rod is a smooth end surface, the tip being inserted into the blind hole.

7. The electromagnetic stylus according to claim 1, wherein a third straight slot is arranged on a side, proximal to the nib, of the cartridge, and the protrusion of the first magnetic core enters the cartridge via the third straight slot and is fixed to the groove.

8. A processing device, comprising a mold for manufacturing the cartridge of the electromagnetic stylus as defined in claim 1, applicable to injection molding the cartridge and fixing the first magnetic core into the cartridge; wherein the mold comprises an upper mold assembly and a lower mold assembly engaged with the upper mold assembly;
   wherein the upper mold assembly comprises an upper mold seat and an upper mold backing plate, an upper mold nested on a side, proximal to the lower mold assembly, of the upper mold backing plate, and an adhesive injection port running through the upper mold seat, the upper mold backing plate, and the upper mold, which are all sequentially stacked from top to bottom, a plurality of guide grooves in communication with the adhesive injection port are arranged on a side surface, distal from the upper mold backing plate, of the upper mold; and
   wherein the lower mold assembly comprises a lower mold seat, a lower mold backing plate, and a lower mold fixing plate, and a lower mold nested on the lower mold fixing plate, which are all sequentially stacked from top to bottom, a plurality of divergent runners corresponding to the plurality of guide grooves, and an ejector sleeve configured to mold the cartridge and an ejector sleeve pin nested in the ejector sleeve and configured to fix the first magnetic core being arranged a side, proximal to the upper mold, of the lower mold, the first magnetic core being sleeved onto an upper portion of the ejector sleeve pin and an upper end of the first magnetic core being tightly attached to an inner wall of the ejector sleeve, a lower end of the first magnetic core and a middle portion of the ejector sleeve pin being spaced apart from the inner wall of the ejector sleeve to define a cavity, one end of the divergent runner being in communication with the guide groove, and the other end of the divergent runner being in communication with the cavity.

9. The processing device according to claim 8, wherein a lower portion of the ejector sleeve pin sequentially runs through the lower mold seat, the lower mold backing plate, and the lower mold fixing plate, and is abutted against one end of the ejector sleeve.

10. The processing device according to claim 8, wherein an outer diameter of the ejector sleeve pin progressively increases from the lower portion through the middle portion to the upper portion.

11. The processing device according to claim 8, wherein the number of guide grooves and the number of divergent runners are both two, the guide grooves comprise a first guide groove and a second guide groove that are in communication with the adhesive injection port, and the divergent runners comprise a first divergent runner corresponding to the first guide groove and a second divergent runner corresponding to the second guide groove.

12. The processing device according to claim 11, wherein the first divergent runner and the second divergent runner convey an adhesive to the middle portion of the ejector sleeve.

13. The processing device according to claim 8, wherein the upper mold assembly further comprises an elastic soft rubber arranged on a side, proximal to the lower mold assembly, of the upper mold, the elastic soft rubber being provided with a central through hole, wherein before closing of the mold, the first magnetic core is sleeved onto the ejector sleeve pin, and after closing of the mold, the upper end of the first magnetic core is abutted against the central through hole.

14. The processing device according to claim 8, wherein the lower mold assembly further comprises guide posts arranged at four corners of the lower mold, and the upper mold assembly comprises guide sleeves corresponding to the guide posts, the guide posts moving upward and downward along the guide sleeves to complete closing and opening of the mold.

15. A processing method, comprising:
providing a processing device and a first magnetic core as defined in claim 8; and
forming the cartridge by injection molding;
wherein the cartridge and the first magnetic core are integrally connected.

* * * * *